Marvin M. Bonner,
Inventor.
Koenig, Senniger,
Powers, and Leavitt,
Attorneys.

March 31, 1970 M. M. BONNER 3,504,156

BONDING APPARATUS

Filed April 17, 1967 4 Sheets-Sheet 2

United States Patent Office 3,504,156
Patented Mar. 31, 1970

3,504,156
BONDING APPARATUS
Marvin M. Bonner, Houston, Tex., assignor to Texas Instruments Incorporated, Dallas, Tex., a corporation of Delaware
Filed Apr. 17, 1967, Ser. No. 631,424
Int. Cl. B23k 9/28, 11/10
U.S. Cl. 219—87 17 Claims

ABSTRACT OF THE DISCLOSURE

During a cycle of operation each of several electrodes is moved into electrical contact with a workpiece and then is forced against it with a predetermined force. The contact force or pressure applied to the workpieces by each of the electrodes is independently governed by a separate force-setting device for each electrode. The apparatus senses when each electrode is exerting the predetermined force and, when this condition is sensed, welding current is applied to the electrodes. Operation of the apparatus is controlled by coding on a program card.

The invention relates to welding apparatus for simultaneously bonding two opposed leads of an electronic device such as a semiconductor network (SCN) to a circuit pattern on a circuit board.

As is known during welding operations the welding electrodes including those of the parallel-gap type preferably exert a force on such workpieces. The electrodes can be rigidly mounted with respect to each other and jointly biased toward the workpiece or they can be jointly biased toward the workpieces by compensating means interconnecting the electrodes for balancing the force exerted by each electrode so that the forces are equal. The present invention on the other hand provides means for individually setting the force exerted by several electrodes independently of the force exerted by several other electrodes, and for electrically exciting the electrodes to weld only after a desired pressure is exerted by several electrodes.

Thus, among the several objects of the invention may be noted the provision of improved means for independently controlling the pressure exerted by each of several electrodes on workpieces; the provision of improved bonding apparatus capable of sensing when a predetermined pressure is being applied by each of several electrodes and for initiating bonding operation only after the predetermined force has been applied by each electrode; the provision of improved bonding apparatus for simultaneously welding two opposed leads of an electronic component or device to a circuit pattern; the provision of improved bonding apparatus for automatically welding each of ten or more leads of microminiature electronic components to a circuit pattern or the like; and the provision of bonding apparatus for automatically welding opposed leads of electronic components to a circuit pattern by using a carrier assembly adapted to hold the components and a card containing coding for controlling movement of the carrier and operation of the bonder. Other objects will be in part apparent and in part pointed out hereinafter.

In general bonding apparatus of the invention comprises a fixed support and a first movable member on the support. At least one welding electrode is provided on the first movable member for engagement with a workpiece to be bonded. A second movable member is provided on the support. Force-setting means carried by the second movable member includes resilient means forming a resilient connection between the first and second movable members for generating and transmitting a desired force from the latter to the former as the latter moves relative to the former. A brake mechanism is provided for stopping advance of the second movable member relative to the first movable member at the desired force setting. A switch is operated when said advance occurs sufficient to bring about said force. Means connects the switch with the brake mechanism to set the brake to stopping position when the switch is operated. Means is provided for initiating flow of bonding current to the electrode in response to operation of the switch.

Referring to the drawings.

Corresponding reference characters indicate corresponding parts throughout the several views of the drawings.

Figure 1:
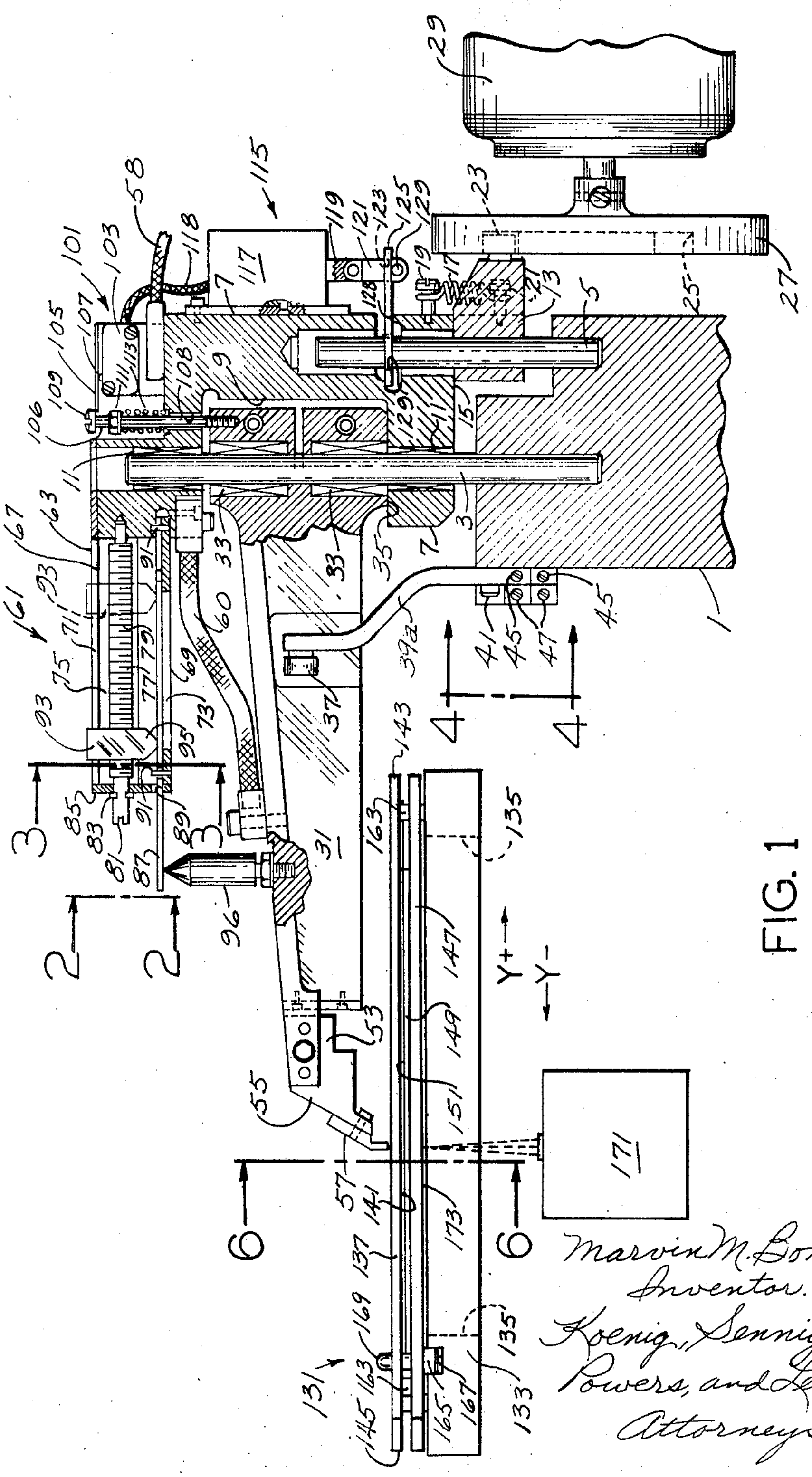
FIGURE 1 is a view, partially in elevation and partially in section, of bonding apparatus of the invention showing electrodes positioned over a workpiece and diagrammatically illustrating a scanner or reader which is used for controlling movement of the workpiece with respect to the electrodes.
Figure 5:
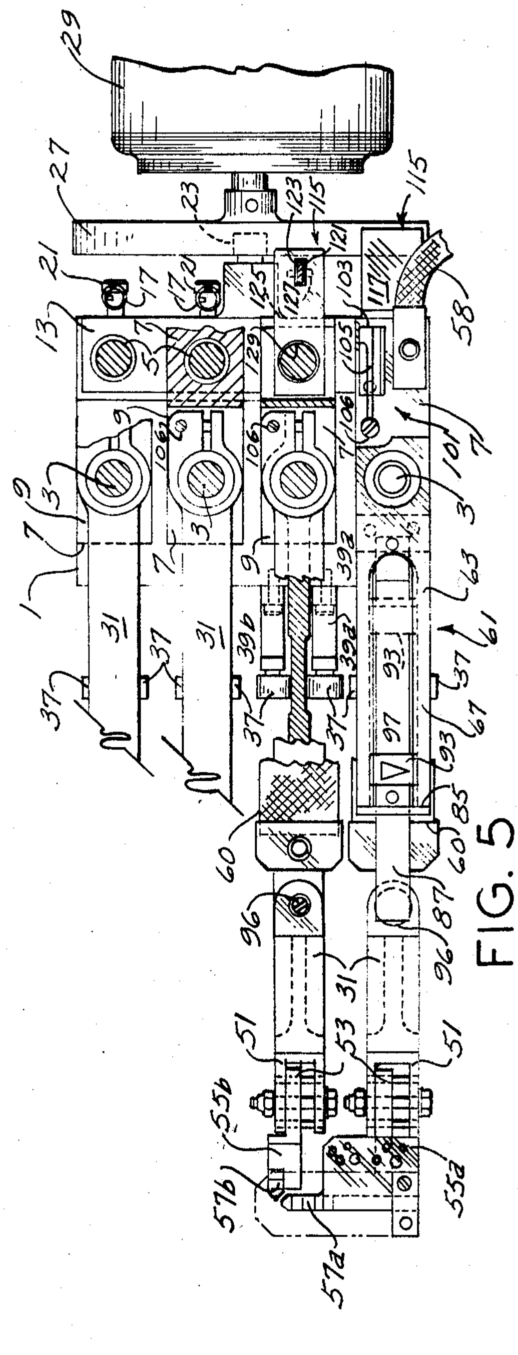
FIGURE 5 is a fragmentary plan view of the FIGURE 1 apparatus progressively cut away from the bottom to the top of the figure.

Referring now more particularly to FIGURES 1 and 5 of the drawings, bonding apparatus made according to the invention comprises a base 1 which is supported on a table or platform (not shown). Four pair of pins 3 and 5 are mounted on the base and project from the upper surface thereof. Each pair of pins is in a plane which is generally parallel to the plane of the other pairs of pins. Four block-like body members 7 are provided, each of which has a notch 9 opening to its left side. Each block is mounted on pin 3 by upper and lower linear bearings 11 and maintained in alignment by a pair of set screws which face pin 5.

The four body members 7 are moved with respect to base 1 on the pins 3 and 5 by a drive or cross-head member 13. The drive member lies beneath all four body members and slides on all four rods 5. The drive member is in contact with the lower surfaces 15 of the body members. The drive member is flexibly connected to the body members by four coil springs 17, each of which is secured to one of the body members 7 by a bolt 19 and secured to the drive member 13 by another bolt 21. Springs 17 under circumstances to be described, permit the drive member 13 to move independently downwardly away from the lower surface 15 of any one or all of the body members. Drive member 13 is moved vertically on pins 5 by a cam follower 23 which rides in a groove 25 cut in a plate cam 27 driven by a motorized drive 29. During each revolution of the drive shaft and of the cam 27 the drive member 13 and each of the body members 7 are resiliently pulled downwardly after some lost motion referred to below and then positively pushed upwardly upon reversal of the cam.

Each of the pins 3 mounts one of four arms 31 which comprise supports for welding electrodes as explained below. The arms 31 are mounted for vertical movement on pins 3 with respect to base 1 by linear bearings 33. One end portion of each arm is positioned within the notch 9 in a body member 7. Normally the lower surface 35 of each arm rests on the lower surface of the notch as shown in FIGURE 1. However, as explained later the arms 31 may remain stationary with respect to the pins 3 and the downwardly moving body members 7 and, when that occurs, the lower surfaces 35 of the arms separate from the lower surface of the notches 9.

Figure 4:
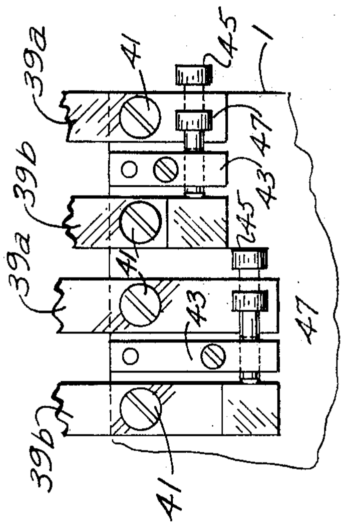
FIGURES 2–4 are enlarged views taken along lines 2—2, 3—3 and 4—4, respectively, in FIGURE 1.

Each of the arms 31 is guided in its vertical movement by a pair of rollers 37 which bear against opposite sides of the arms as shown in FIGURE 5. The rollers are carried by a pair of arms 39*a* and 39*b* which are pivoted to the base 1 by pins 41 (FIGURES 1 and 4). A block 43 is fixed to the base 1 between the lower end of arms 39*a* and 39*b*. The arm 39*a* is adjusted about its pivot 41 by an adjusting screw 45 which is threaded through the lower end of arm 39*a* beneath pivot 41 and bears against the block 43 so that tightening of the pin 45 against block 43 causes the arm 39*a* to swing in a counterclockwise direction as viewed in FIGURE 4. Arm 39*b* is biased about its pivot 41 by an adjusting screw 47 which is threaded through the block 43 and bears against the end of arm 39*b* beneath its pivot 41, thereby biasing arm 39*b* in a clockwise direction about its pivot. In this manner the rollers 37 can be independently adjusted to exert the desired sidewise pressure on the arms 31 and accurately guide them in a vertical direction. Accurate positioning of the arms is important when the welding apparatus is being used for bonding leads of miniature SCN electronic components to a circuit board as explained below. As shown in FIGURES 1 and 4, the adjusting screws 45 and 47 for the pair of arms 39 guiding two adjacent arms 31 are preferably vertically offset so that they are conveniently reached for adjustment from the ends of the base 1. The adjusting screws 45 and 47 for the two arms at one side of the base 1 can be the mirror image of the corresponding adjusting screws at the other end of the base. This permits two of the arms to be adjusted from each end of the base.

Figure 6:
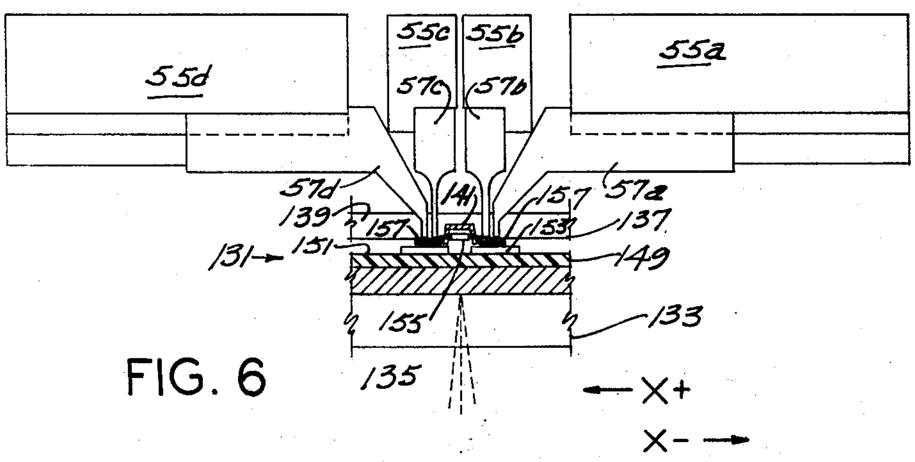
FIGURE 6 is an enlarged fragmentary front elevation taken generally along line 6—6 in FIGURE 1.

Referring to FIGURE 5, the outer end of each arm 31 is bifurcated to form a yoke 51. The yokes each receive a flange portion 53 of one of four electrode mounting members designated 55*a*, 55*b*, 55*c* and 55*d* (FIGURE 6). The holders 55*a* and 55*b* are the mirror image of the holders 55*d* and 55*c*, respectively. Each of the electrode holders carries an electrode, the four electrodes being designated 57*a*, 57*b*, 57*c* and 57*d*. The two parallel-gap electrodes shown at the right in FIGURE 6 are the mirror image of the two parallel-gap electrodes shown at the left. The different shapes of the electrode holders and the electrodes permit the lower contact end portion of the electrodes to be close to each other for simultaneously bonding two opposed leads of a miniature electronic device to a circuit board as explained below. When the bonding apparatus is used for welding other types of workpieces, the electrode holders and the electrodes may be of other configurations. Welding current is provided for the electrodes by four pairs of flexible conductive straps. One strap 58 of each pair is connected to a block 7 and to a source of welding current and the other strap 60 of each pair is connected to the block 7 and the associated arm 31.

Figure 3:
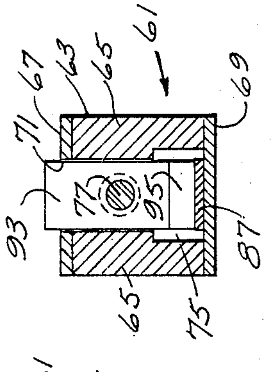
Figure 2:
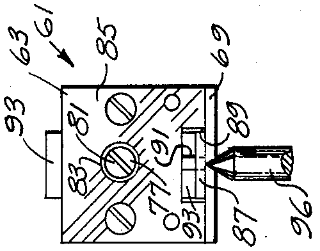

The pressure exerted by each electrode against a workpiece is determined by a force setting mechanism generally designated 61 (FIGURES 1–3). One force setting mechanism is provided for each arm 31, and each mechanism comprises a housing 63 which is secured to the body member 7 above notch 9. The housing comprises a pair of spaced side walls 65 and upper and lower cover plates 67 and 69, respectively. The upper plate 67 is slotted at 71 and the lower plate has a slot through it as shown at 73 in FIGURE 1. This construction provides a space 75 in the housing.

A shaft 77 extends through the housing from front to rear. The central portion of the shaft is larger in diameter than the end portions and it is threaded as shown at 79. One end of the shaft is rotatable in the body 7 above notch 9 and the other end portion of the shaft projects through a cover plate 85 at the front of the housing and has a screw driver kerf 81 for rotating the shaft in the housing. Axial movement of the shaft is limited by a snap ring 83 which abuts the cover plate 85 at one end of the housing and by the threaded portion 79 of the shaft which is engageable with the front cover plate.

An elongate leaf spring 87 has an end portion positioned within the housing 63 beneath shaft 77 and another end portion of the spring projects from the housing through a wide slot 89 in the cover 85. The slot 89 is larger than the thickness of the spring to permit limited flexing of the spring in the cover plate. The spring is held against longitudinal movement by a pair of pins 91 carried by the bottom plate 69 and projecting up through holes in the spring.

A screw follower 93 on to the threaded portion 79 of shaft 77 projects through the slot 71 in the upper plate 67 and abuts the sides of the slot so that when the shaft 77 is rotated the follower travels along the threaded portion of the shaft. The follower has a tapered end portion 95 which contacts the upper surface of the leaf spring 87 and provides a fulcrum about which the projecting end portion of the spring can be flexed. By adjustment of the follower 93 the effective length of the leaf spring can be varied thereby to change the force or pressure required to flex the spring upwardly. When the follower is in the position shown in solid lines in FIGURE 1, the effective length of the spring 87 is short and a relatively high pressure is required to deflect it whereas movement of the follower to the position shown in the dotted lines in FIGURE 1 increases the effective length of the spring and thereby reduces the force required to flex it.

When any of the body members 7 is pulled downwardly toward the base by operation of the drive means the respective force-setting mechanism 61 is also lowered. The outer end of the spring 87 contacts the tapered end of a stud 96 mounted on the respective arm 31 and deflects to supply increasing force with spring deflection. This force is applied to the arm 31 through the stud 96. This results in a pressure of the electrodes on the SCN leads and between them and their underlying circuit pattern. This pressure should be predetermined for best welding. Thus not until a predetermined force is reached, by deflection of the spring 87, should welding current be fed to the pairs of parallel-gap electrodes 57*a*, 57*b* and 57*c*, 57*d*. As the spring 87 flexes, the bottom of notch 9 of the body member separates from the surface 35 of the arm. This relative movement is sensed and is used to initiate flow of welding current as explained below. Since there is a separate force-setting mechanism for each arm, the force-setting mechanism for each can be adjusted so that each electrode will exert any desired (i.e., substantially the same) force on the workpiece. Each fulcruming follower 93 preferably has a marker 97 (FIGURE 5) on its upper surface which be used together with a scale (not shown) along the upper edge of the top plate 67 of the housing to set the force that will be exerted by the electrode upon the workpiece.

Force sensing means generally designated 101 (FIGURE 1) are provided for sensing when each of the electrodes is exerting the desired force on the workpiece (as determined by the force-setting means 61). Each force sensing means comprises a switch 103 carried on the top of one of the body members 7. The switch 103 is actuated and deactuated by a leaf spring actuator member 105 carried on the top of the switch which is adapted to engage a spring biased member 107 projecting from the switch housing. When the spring 105 is depressed against the member 107, the switch is open and when the spring member 105 is released, it raises up to permit extension of the member 107 for closing the switch.

The leaf spring member 105 is depressed by a screw 106 which passes through a hole 108 in the body 7 and is threaded into the base portion of the associated arm 31. The screw 106 has a head 109 which is engaged by the upper surface of the outer end of the leaf spring 105. When the arm 31 stops moving downwardly with the body 7 as a result of the electrodes 59 contacting the workpiece with the desired force, causing the spring 87 to flex enough to separate the bottom of notch 9 on body 7 from the respective arm surface 35, the head 109 of the screw will remain stationary while the switch moves downwardly with the body 7. This relative movement continues until leaf 105 retracts upwardly from member 107 as the leaf and the switch 103 descend. This closes switch 103. A shoulder-forming nut 111 on the upper portion of the screw 106 and a spring 113 surrounding the screw and reacting from the body 7 against the nut counterbalances the weight of the arm 31 to provide a minimum electrode force.

When the force sensing means 101 senses (by closing of switch 103) that the electrode is bearing against the workpiece with the desired force (as determined by the force setting means 61), the body 7 is braked or locked against further downward movement by brake means generally designated 115 (FIGURES 1 and 5). The brake means comprises a solenoid 117 on body 7 which is energized when swtich 103 is closed. The solenoid is connected to switch 103 by conductor 118. The solenoid has a plunger 119 projecting from its lower end and it is pinned to a link 121 which extends through a hole 123 in a brake plate 125. The plate projects into a lateral opening in body 7. Normally the plate rests on a pin 127 at the lower end of link 121 and on a shoulder 128 on the body. The pin 5 projects through a hole 129 in the plate, the hole being slightly larger than the diameter of the pin 5.

When switch 103 is actuated to energize solenoid 117 the rod 119 is retracted (moved upwardly) to raise the pin 127 and the end portion of the plate 125 resting on it. This tilts the plate from the position shown in FIGURE 1 wherein it is substantially perpendicular to the axis of pin 5 to a position wherein the periphery of the hole 129 in the plate is forced against the pin 5, thereby locking the plate 125 against movement with respect to the pin 5. Since the plate 125 is carried by the solenoid which in turn is mounted on the body 7, operation of the solenoid 117 locks the body member 7 against movement with respect to pin 5 and base 1. This does not interfere with continued operation of the power means or drive means since the flexible connection between members 13 and 7 provided by the springs 17 permits each body member 7 independently to remain stationary with respect to the drive member 13. Thus the drive member 13 can separate itself for downward movement from the lower surface 15 of each of the body members. The amount of separation between the surface 15 and the drive member 13 may be different for each of the four body members since the time in the cycle of operation at which each body member becomes stationary depends upon the setting of the force-setting mechanism 61 and operation of the sensing means 101 and the brake means 115. The sensing means 101 are connected in the control circuit for the bonder so that when all of the sensing means signal that all four of the arms 31 have stopped current is provided to the electrodes for welding the workpieces.

Referring to FIGURES 1 and 6–9, a carrier assembly generally designated 131 is positioned beneath the electrodes 59 and it is supported by a so-called X–Y table 133 (FIGURE 1). The X–Y table is mounted on any suitable support (not shown) and is driven in a conventional manner back and fourth in two directions perpendicular to each other, that is, either to the left and right as viewed in FIGURE 6 (referred to as the X plus and X minus directions, respectively) or to the right and left as viewed in FIGURE 1 (referred to as the Y plus and Y minus directions, respectively). These directions have been marked adjacent the assembly in FIGURES 1, 6, 7 and 9 to facilitate understanding of the operation of the apparatus as set forth below. The X–Y table has a hole 135 through it which is sufficiently large to view the necessary portions of the program card shown in FIGURE 9.

The carrier assembly 131 comprises a carrier plate 137 which is generally in the shape of an open rectangular frame having a large hole or opening 139. A plurality of spaced generally parallel channels 141 extend across the opening 139 from one side 143 to the opposite side 145 of the carrier plate. There are a plurality of narrow spaced slots (not shown) in the side flanges of each channel for locating electronic components in the channels.

The carrier assembly further comprises a program card or plate 147 and a printed circuit board 149 which is sandwiched between the carrier plate 137 and the program plate 147. The circuit board has an upper face 151 which faces into the recesses in the channels 141. The face 151 contains a conductive circuit pattern 153 (FIGURE 6) to which electronic devices or components are to be connected by the bonder of the invention. The electric components illustrated in the drawings are semiconductor networks (SCN devices) 155 (FIGURE 6) each of which has a plurality of spaced conductive leads 157 projecting from opposite sides of the device and received in the slots or notches 144 in the channels. Normally semiconductor devices of this type contain either ten or fourteen leads, half of which project from each side of the device. A portion of the printed circuit pattern 153 (FIGURE 6) is located beneath each of the device leads which is to be connected to another circuit component. The devices are arranged end-to-end in the channels 141 so that when the circuit board is properly located on the carrier assembly, the leads can be bonded to the desired portions of the circuit pattern. Proper registry between the circuit board and the channels is obtained by a pair of locating pins 159 (FIGURE 7) which project down through aligned holes or openings in the carrier plate 137 and the circuit board 149. The pins 159 are mounted on the lower surfaces of leaf springs 161 which are fixed to the upper surface of the carrier plate to provide positive location of the circuit board.

The carrier plate 137 and the program plate 147 are held together by four conventional locking members 163 located near the corners of the assembly. The assembly is located on the X–Y table 133 by two sleeves 165 on the program plate which are received in recesses 167 in the upper surface of the X–Y table. The carrier plate also includes a pair of locating pins 169 which project from the upper face (FIGURE 7) of the carrier plate. These pins are used for locating the carrier plate on an X–Y table when the plate is inverted from the position shown in FIGURES 1, 6 and 7 and electronic components 155 are being loaded into it.

Figure 10:
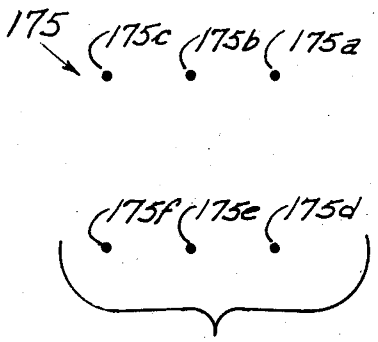
FIGURE 10 is a diagrammatic view of the cells in the sensing head of the program reader.

A program scanner or reader 171 (FIGURE 1) is located beneath the X–Y table 133 and it is adapted to scan the lower surface 173 of program card 147 through the hole 137 in the X–Y table. The scanner has a sensing head containing six sensing cells generally designated 175 in FIGURE 10. The cells are arranged in two parallel lines. One line contains cells **175*a*, 175*b* and 175*c* while the other line contains cells 175*d*, 175*e* and 175*f*. Each line of sensing cells is used in conjunction with a program or code comprising an array of three dots or other indicia arranged in a line. The presence or absence of each of the three dots of the code is sensed by a line of the cells to control operation of the X–Y table and control the number of welds made, i.e., whether ten or fourteen device leads are to be welded. Each line of the sensing cell 175 is a duplicate of the other and they read the program or code at spaced intervals equal to the distance between the two end leads at the same side of the semiconductor network. The cells 175***a*, 175*b* and 175*c* are used for sensing the program or code when the X–Y table is moving in one Y direction and the other three cells are used when the X–Y table is moving in the other Y direction. By alternately using two lines of cells, the table can be stopped with the electrodes above the leading or first lead of a device whether the X–Y table is moving in the Y positive or Y negative direction.

Figure 11:
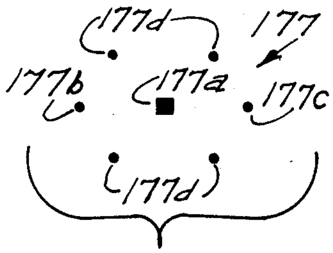
FIGURE 11 is an enlarged view showing the arrangement of the coding or pattern of dots on the program card as viewed from the bottom of the carrier assembly.
Figure 9:
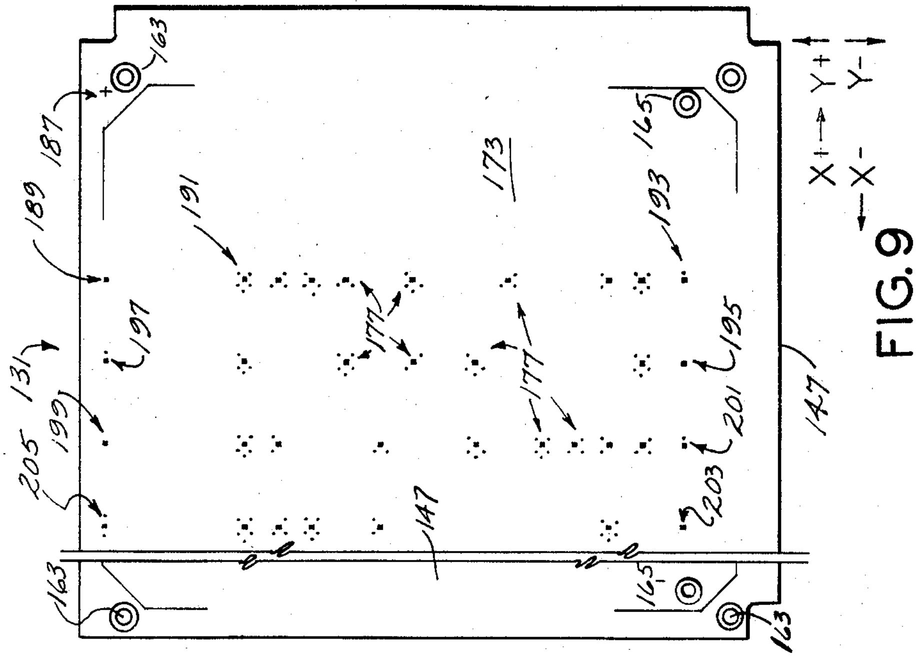
FIGURE 9 is a view of the bottom of the carrier assembly as viewed along line 9—9 on the right side of FIGURE 8, showing the coding for programming movement of the carrier assembly with respect to the welding electrodes.
Figure 7:
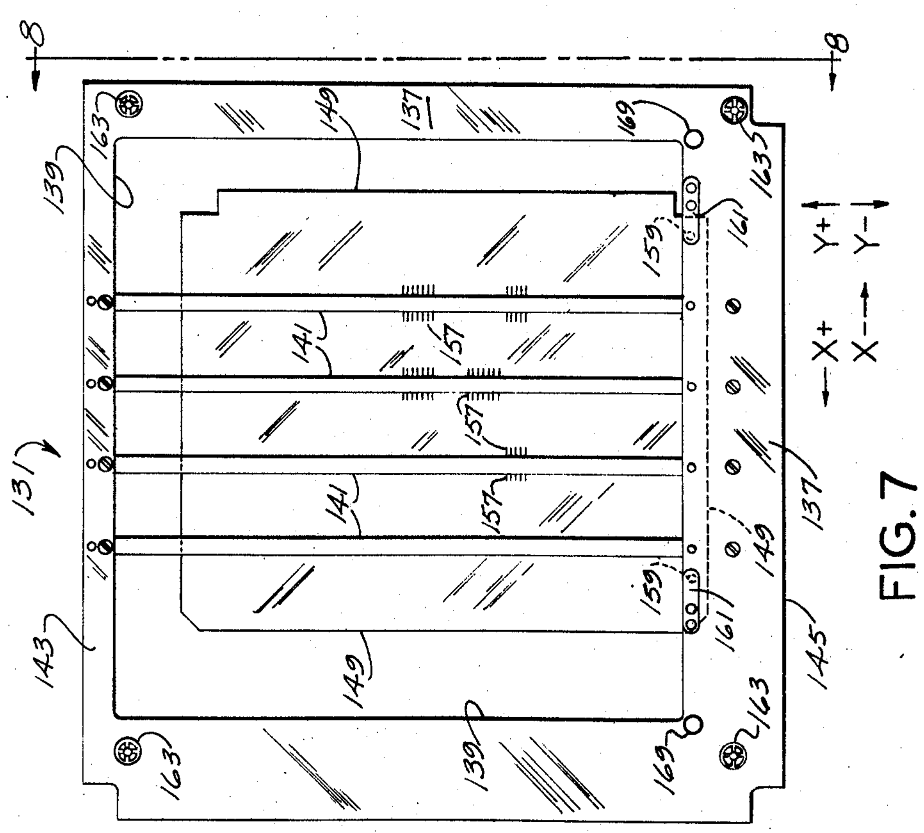
FIGURE 7 is a plan view of a carrier assembly for holding the workpieces.

The surface 173 of the program card contains a plurality of discrete recognition patterns or codes designated 177 in FIGURE 9 and FIGURE 11. The patterns or codes are used for programming the bonding operation and each comprises an array of dots. One row of dots contains a rectangular center dot 177*a* and two circular dots 177*b* and 177*c* located on opposite sides of the center dot. The code or pattern shown also comprises as many as four additional dots each of which is designated 177*d*. Dots 177*d* are arranged at the corners of an imaginary rectangle around the center dot 177*a*. The dots 177*d* are used for controlling operation of apparatus (not shown) for loading the semiconductor networks in the channels of the carrier plate 137.

When the sensing head 175 detects the presence of one or a combination of the dots 177*a*, *b* and *c*, the control means for the apparatus initiates a particular operation. For example, when the X–Y table is traveling in an X direction and either the sensing cell 175*b* or cell 175*e* senses the presence of the center dot 177*a*, the control means may stop movement of the table in the X direction and begin movement of the table in a Y direction. On the other hand, when the table is already moving in a Y direction and cell 175*b* or cell 175*e* senses the presence of the dot 175*a*, then the control means may stop movement of the table, proceed through a cycle of bonding operation to make a series of bonds and then continue movement of the table in the same Y direction.

Since the bonder will make either a series of five or seven welding operations at this time (depending upon the number of leads on the semiconductor network which is at the time located beneath the welding heads) the dot 177*b* is used for controlling the number of welding operations which take place. For example, the presence of the dot 177*b* in the pattern or code may be used to indicate that a fourteen lead device is beneath the welding head and seven series of two welds are required for bonding each of the device leads to the circuit board. Similarly, the absence of the dot 177*b* may be used to indicate that the electronic device is a ten lead device and only five series of two welding operations are required.

The dot 177*c* is used in combination with the dot 177*a* for instructing the control means to stop movement of the X–Y table in either Y direction and to move the table and program card in one of the X directions, e.g., to move the card in the X positive direction. The presence of all three dots 177*a*, *b* and *c* in one recognition pattern or code is used for terminating operation of the bonder, indicating that all of the desired welds have been performed. The control means is preferably programmed to return the X–Y table to its original or start position when all three dots are sensed in one recognition pattern.

Figure 12:
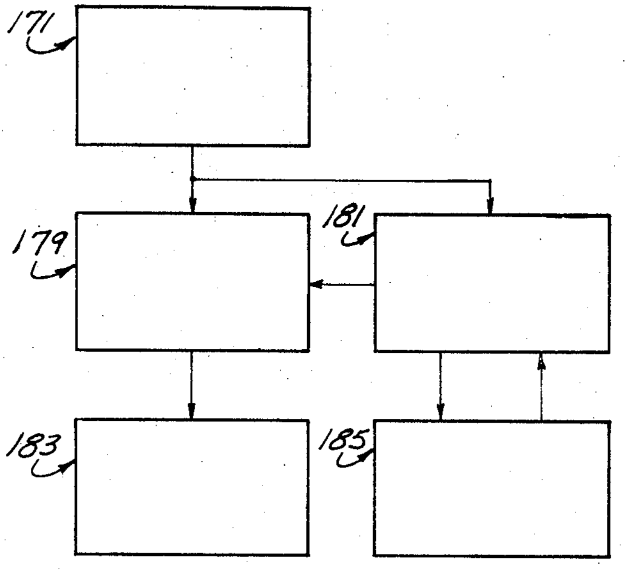
FIGURE 12 is a block diagram of the control system for the apparatus.
Figure 8:
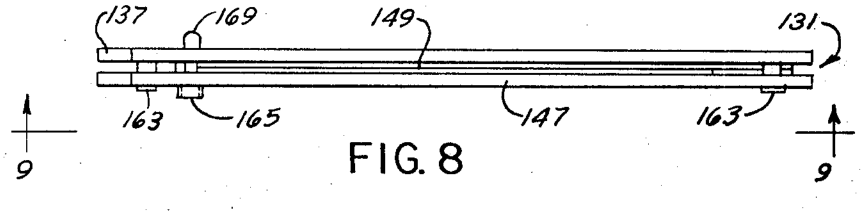
FIGURE 8 is a side elevation of the carrrier assembly as viewed along line 8—8 at the right side of FIGURE 7.

FIGURE 12 of the drawings shows a block diagram of control means for operating the bonder of the invention. When the program reader or scanner 171 senses the presence of one or more of the dots 177*a*, *b* and *c*, it provides a signal to the X–Y table control logic system designated 179 and to the bonding control logic system designated 181. When the signal received by the table control logic system 179 calls for movement of the X–Y table, then a signal is provided for the X and Y axis motor drives generally designated 183. When the signal received by the bonding logic system 181 indicates that a weld is to be made, a signal is provided from the bonding logic system to the bonding head drive diagrammatically shown at 185 (which includes motor 29). This drives the bonding apparatus through a cycle of operation during which electrodes 57*a* and 57*b* weld one of the device leads 157 to the circuit board and the other two electrodes 57*c* and 57*d* weld the opposite lead 157 to the circuit board. When the bonder has completed bonding of the first pair of device leads, a feedback signal is provided from the bonding head drive 185 to the bonding logic system 181, and from there to the X–Y table control logic system 183 which advances the X–Y table in a Y direction to move the next pair of leads 157 beneath the four electrodes of the bonding apparatus. The X–Y table then stops and the second bonding operation takes place. The table is indexed and bonding steps are repeated until all of the leads 157 are bonded to the table. Then the X–Y motors drive the table in a Y direction until the sensing head again senses one or more of the dots forming the pattern or code 177.

Operation of the bonding apparatus will now be described.

Assume initially that the carrier assembly 131 is positioned on the X–Y table as shown in FIGURE 1 with the X–Y table being located so that the sensing head of the scanning or program reading device 171 is scanning the point designated 187 in FIGURE 9. This point 187 is beneath the upper left part of the assembly as viewed in FIGURE 7. This table position will be considered the zero or start position. At this time the X–Y table is at its maximum Y negative position, i.e., toward the front of the apparatus (to the left in FIGURE 1). When the apparatus is turned on, the X–Y table begins moving in an X positive direction thereby moving the program plate 131 to the right as viewed in FIGURE 9 (to the left as the assembly is viewed in FIGURE 7). The table moves in the X positive direction until the sensing head 175 detects one or more of the dots comprising the pattern or code 177, the first element of coding being designated 189 in FIGURE 9 and comprising only the center dot 177*a*. The sensing head of the reader 171 then provides a signal to both the X–Y table control logic 179 and the device bonding logic 181. The control means is programmed so that when the table 133 is moving in an X positive direction and dot 177*a* alone is sensed, the motor driving the table in an X positive direction is stopped and the motor for driving the table in the Y direction is started and moves the table in a Y positive direction, thereby moving the carrier assembly to the right as viewed in FIGURE 1. Since no bonding operation is to take place at this time, the device bonding logic 181 does not initiate operation of a welding cycle. The X–Y table continues to move in the Y positive direction until the sensing head of the scanning device detects the next recognition pattern or code group 177 of dots. This pattern or code group is designated 191 in FIGURE 9 and is shown to comprise the rectangular center dot 177*a* and the left dot 177*b*. The pattern also consists of four of the dots 177*d* which, as previously mentioned, have no bearing or effect on operation of the bonding device. The control means is programmed so that when the table is moving in either Y direction and senses the presence of the dot 177*a*, the signal provided to the X–Y table control logic 179 stops the X–Y table motors, thereby stopping the X–Y table. At the same time a signal is provided to the device bonding head drive 185 to start motor 29 which drives the apparatus shown in FIGURES 1–6 through a cycle of operation. At this point it should be noted that the coding on the program card is related to the location of electronic devices 155 on the carrier assembly so that the table stops at each device with the welding electrodes over the two leads 157 at the leading end of the device. The number of bonds or welds to be made depends on the number of leads on a device 155, and this information is furnished to the control means by the presence or absence of the dot **177*b*. As explained above, the presence of dot 177*b*** may be used to indicate that a fourteen lead device is to be bonded to the circuit boards.

When motor 29 is energized it is driven through one partial revolution of the motor shaft and then reversed thereby to rotate the cam 27 through one complete cycle. Rotation of the cam causes translation of the drive member 13 downwardly and then upwardly. Upward movement of crosshead 13 lifts all of the members 7 by contact therewith. Downward retraction is accomplished through the springs 17. Downward movement of the body members is transmitted by each of the four associated force-setting devices 61 to each of the four arms 31 which carry the welding electrodes 57. As each electrode exerts a predetermined force on its respective lead 157 of the electronic device (as determined by the setting of the follower 93 on the spring 87) then the spring 87 begins to flex as the associated arm 31 remains stationary with respect to the lead 157.

Each body 7 continues downward movement after its respective arm stops. As a body 7 descends relative to its fixed arm 31 the leaf 105 descends relative to head 109, thereby actuating the solenoid 117 on the body member 7. This retracts the plunger 119 into the solenoid, thereby tilting the locking plate 125 and locking the body 7 against further downward movement with respect to the base 1. The drive member 13 may continue its downward movement due to the flexible connection the springs 17 provide between the member 13 and each of the body members 7. When all four switches 103 have been closed to lock all of the body members 7, the control means stops the motor and then provides welding current to the electrodes. Preferably the instantaneous polarity of the voltage is the same as at the two center electrodes **57*b* and 57*c*, and this polarity is opposite to the polarity at the two outside electrodes 57*a* and 57*d*. The force-setting means 61 acts through the electrodes to maintain the desired pressure on the workpieces while current is provided to the device leads 157**.

The motor 29 reverses after the welding operation and rotation of the cam ultimately moves the crosshead 13 upwardly against the lower surface 15 of each of the body members 7, thus raising them simultaneously on the pins 3 and 5 until all of the switches 103 are opened, thereby deactuating the solenoids 117 and disengaging the locking or brake mechanisms. Some upward movement of the body members on pins 3 and 5 occurs prior to the time the brakes are released.

After the first two leads are welded to the circuit pattern the X–Y table control logic provides a signal to the X–Y table motor drive to advance the table in a Y positive direction by a distance equal to the spacing between the device leads 157, i.e., approximately 50 mils. Then a second welding cycle is initiated and the next two leads are welded. This cycle of operation is repeated until all ten or fourteen leads of a device are welded to the circuit board. After the last bonds have been made, the X–Y table control logic resumes movement of the table in a Y positive direction. The leads 157 of a device are welded to the circuit board each time the sensing head detects the presence of one of the dots **177*a* on the program card, either alone or in combination with one of the dots 177*b*. However, when the scanner 171 detects the presence of the dot 177*a* in combination with the dot 177*c*, such as shown at 193 at the bottom of the right row of coding in FIGURE 9, then the signal provided to the X–Y table control logic 179 and from there to the X–Y motor drives 183 instructs the drives to stop movement of the table in the Y positive direction and begin movement of the table and the carrier assembly in the X positive direction, that is, to the right as viewed in FIGURE 9. This movement continues until the scanner detects the presence of the single dot 177*a* shown at 195**. The X–Y table control logic then instructs the motor drives to stop movement of the table in the X positive direction and begin movement of the table in the Y negative direction.

As the table moves in the Y negative direction the program scanner 171 scans the next row of the coding and each time it detects the presence of the dot **177*a*, either alone or in combination with the dot 177*b*, the before described cycle of operation of the bonding apparatus takes place to effect welding of the leads to the circuit board pattern. At the top of the second row of coding the scanner detects the presence of the combination of the dots 177*a* and 177*c* designated 197 which causes the X–Y table control logic to stop movement of the table in the Y negative direction and initiate movement of the table and the carrier assembly in the X positive direction. Movement continues in this direction until the scanner detects the single dot 177*a* designated 199 at the top of the third row of coding at which time X positive movement of the table stops and the table begins moving in the Y positive direction. The previously described multiple welding operations occur each time the scanner detects the dot 177*a* until the scanner detects the combination of dots 177*a*, 177*c*, designated 201 at the bottom of the third row of coding. Then Y positive movement of the table is stopped and X positive movement is initiated. When the single dot 177*a* designated 203 at the bottom of the fourh row of coding is detected X positive movement stops and Y negative movement is again initiated. Then welding operations are performed in accordance with the dot pattern or coding contained in the fourth row of the coding. Finally the scanner detects the presence of the combination of the three dots 177*a***, *b* and *c* designated 205 at the top of the fourth row of coding. The signal then provided to the X–Y table control causes movement of the X–Y table in the X negative direction to its original or start position at which time the program reader or scanning device is immediately beneath the point marked 187 on the program card 147. The carrier assembly is then disassembled and the circuit board 149 with the electronic devices 155 bonded thereto can be removed.

In the following claims a fixed support or a fixed guide means refers to the pins 3 and 5. The first movable or sliding member refers to an arm 31 and the second movable or sliding member refers to a body member 7. The force-setting means 61 has resilient means 87 which forms the claimed resilient connection between the arm 31 and the body 7 for generating and transmitting the desired force from the body 7 to the arm 31 as the body moves relative to the arm. The brake mechanism referred to in the claims is shown generally at 115 in the drawings and it stops advance of the body 7 relative to the arm 31 at the desired force setting. The switch 103 is operated when said advance occurs sufficiently to bring about the described force. The switch is electrically connected to the brake mechanism to energize the solenoid 117 of the brake mechanism for setting the brake to the stopping position, i.e., with plate 125 inclined relative to pin 5, when the switch is operated. The control means (FIGURE 12) initiates flow of bonding current to the electrode after switch 103 is operated. The claimed drive means includes the crosshead 13 which is resiliently connected to the various body members 7 so that they are gang operated and positively retract the body members relative to the arm.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. Bonding apparatus comprising:

a fixed support, a first movable member on the support,
at least one welding electrode on said first movable member for engagement with a workpiece to be bonded,
a second movable member on the support,
force-setting means carried by said second movable member including resilient means forming a resilient connection between the first and second movable members for generating and transmitting a desired force from the latter to the former as the latter moves relative to the former,
a brake mechanism having a stopping position for stopping advance of the second movable member relative to the first movable member at the desired force setting,
a switch operated when said advance occurs sufficient to bring about said force,
means connecting the switch with the brake mechanism to set the brake to said stopping position when the switch is operate, and
means for initiating flow of bonding current to the electrode in response to operation of the switch.

2. Bonding apparatus comprising:
fixed guide means,
a first sliding member on the guide means,
at least one welding electrode on said first sliding member for engagement with a workpiece to be bonded,
a second sliding member on the guide means,
force-setting means carried by said second sliding member including resilient means forming a resilient connection between the first and second sliding members for generating and transmitting a desired force from the latter to the former as the latter moves relative to the former,
a brake mechanism having a stopping position for stopping advance of the second sliding member relative to the first sliding member at a predetermined force setting,
a switch operated when said advance occurs sufficient to bring about said force,
means connecting the switch with the brake mechanism to set the brake to said stopping position when the switch is operated, and
means for initiating flow of bonding current to the electrode in response to operation of the switch.

3. Apparatus according to claim 2, including:
driving means for positively driving said second sliding member initially to retract it from the first sliding member, and thereafter advancing it toward the first sliding member until braked,
said driving means including a resilient connection between it and the second sliding member to permit uninterrupted movement of the driving means after braking of the second sliding means.

4. Apparatus according to claim 2 wherein the force-setting means comprises means for adjusting the stiffness of the resilient connection between the first and second sliding members.

5. Bonding apparatus comprising:
fixed guide means,
a first group of first sliding members on the guide means,
at least one electrode on each said first sliding member for engagement with a workpiece to be bonded,
a second group of second sliding members on the guide means, said first and second sliding members being organized in pairs the members of which are members of said groups respectively,
force-setting means carried by each of said second sliding members of the pairs including resilient means forming a force transmitting connection between the members of each pair for independently transmitting force between them as a first sliding member of a pair moves relative to the first sliding member thereof,
a plurality of brake mechanisms each of which has a braking position, said mechanisms respectively independently braking advance of each second sliding member of a pair relative to the first sliding member thereof, at a predetermined independently adjustable force setting for that pair,
a switch for each pair operated when a respective advance in the pair becomes sufficient to bring about the respective desired force,
means connecting each switch with one brake mechanism to set it to its said braking position when the respective switch is operated, and means for initiating flow of bonding current to the electrodes in response to operation of all of the switches.

6. Apparatus according to claim 5, including:
driving means for gang operating all of said second sliding members positively to retract all of the second sliding members from all of the first sliding members,
including resilient connections between said driving means and the respective second sliding members of the pairs to retract them individually before the braking of each and without interrupting action of the driving means.

7. Bonding apparatus comprising:
a base,
a plurality of body members mounted for independent movement with respect to the base,
means for moving the body members with respect to the base comprising a drive member having a separate flexible yielding connection with each of said body members so that the body members can be moved independently with respect to each other,
a plurality of electrodes, one for each body member,
a plurality of arms, one for each electrode, each arm being mounted for movement with respect to the base and each arm carrying an electrode so that said electrodes can be moved into engagement with workpieces by movement of the arms,
a plurality of force-setting means carried by the body members, each force-setting means having a portion engageable with means on an arm so that the force-setting means exert a force on the workpieces through the arms and electrodes when the body members are moved, each force-setting means having means for adjusting the force exerted by its respective electrode on the workpieces so that each electrode can apply a predetermined force on the workpieces,
means for applying a biasing voltage to the electrodes while they are in contact with the workpieces, and
a plurality of force-sensing means for sensing when each electrode is exerting said predetermined force on the workpieces and for initiating application of the biasing voltage to the electrodes after all electrodes are exerting said predetermined force on the workpieces.

8. Bonding apparatus according to claim 7 further comprising means for independently locking each body member against movement in one direction with respect to the base after said predetermined force is being exerted against the workpieces by the electrodes.

9. Bonding apparatus according to claim 8 further comprising:
a plurality of pins carried by the base, each of the arms and body members receiving a pin and being guided by said pins during their movement with respect to the base, and
each locking means comprise a plate having an opening therethrough which receives one of the pins, each locking means having a solenoid mounted on the respective body member and connected to said plate for moving said plate relative to said pin when the solenoid is energized thereby biasing the plate against the pin to prevent further movement of the body member in one direction with respect to said pin until the solenoid has been deenergized.

10. Bonding apparatus according to claim 7 wherein a portion of each body member is between its respective arm and the base, each force-setting means biasing the respective arm toward a body member for conjoint movement of the arms and body members until said predetermined force is being applied by the electrodes, and each force-setting means yielding after its respective electrode is exerting said predetermined force on the workpieces so that the arms can remain stationary thereafter.

11. Bonding apparatus according to claim 7 wherein each force-setting means comprises an elongate leaf spring having one end portion fixed relative to the respective body member, the other end portion of the spring comprising said portion of the force-setting means engageable with the means on the arm, said spring yielding when said predetermined force is exerted on the workpieces by the respective electrode thereby limiting the force exerted on the workpiece by the electrode to said predetermined force, and the adjusting means of each force-setting means comprises a member engageable with the leaf spring at various points along its length for varying its effective length thereby varying the force exerted by the spring before it yields.

12. Bonding apparatus according to claim 7 further comprising:

a carrier assembly comprising means for holding the workpieces beneath the electrodes and coding means for programming operation of the apparatus,
means mounting the carrier assembly for movement with respect to the electrodes,
means for controlling movement of the carrier beneath the electrodes, the control means comprising means for reading the coding means and directing movement of the carrier in response to the coding means, thereby to locate the workpieces with respect to the electrodes.

13. Bonding apparatus according to claim 7 wherein there are two pairs of body members, arms and electrodes, each pair of electrodes being adapted to effect welding between two workpieces.

14. Bonding apparatus comprising:

a base,
a plurality of body members mounted for independent movement with respect to the base,
drive means for moving the body members,
a plurality of electrodes, one for each body member, said electrodes being adapted to be moved into engagement with workpieces by movement of the body members,
force-setting means for each electrode operable upon movement of each electrode's respective body member for controlling the force exerted by the electrode on the workpieces, each force-setting means having means for adjusting the force exerted by each electrode so that each electrode can independently apply a predetermined force on the workpiece,
means for applying a biasing voltage to the electrodes when they are in contact with the workpieces,
each force-setting means comprising a spring carried by the respective body member for exerting pressure on the respective body member for exerting pressure on the respective electrode when the body member is moved by the drive means, said spring yielding when said predetermined force is exerted on the workpiece by the electrode thereby generating the force desired to be exerted on the workpiece by the electrode,
the spring of each force-setting means being in the form of a leaf spring having a portion fixed relative to the respective body member, and the adjusting means of each force-setting means comprises a member engageable with the leaf spring for varying its effective deflection length.

15. Bonding apparatus comprising:

a base,
a plurality of body members mounted for independent movement with respect to the base,
drive means for moving the body members,
a plurality of electrodes, one for each body member, said electrodes being adapted to be moved into engagement with workpieces by movement of the body members,
force-setting means for each electrode operable upon movement of each electrode's respective body member for controlling the force exerted by the electrode on the workpieces, each force-setting means having means for adjusting the force exerted by each electrode so that each electrode can independently apply a predetermined force on the workpiece,
means for applying a biasing voltage to the electrodes when they are in contact with the workpieces,
means for independently locking each body member against movement with respect to the base after the electrode associated with the body member is exerting said predetermined force on the workpiece, and means effecting a flexible connection between each body member and the drive means so that locking of one body member permits continuous operation of the drive means.

16. Bonding apparatus made according to claim 15, including means for initiating operation of the locking means comprising force sensing means responsive to application of said predetermined force on the workpieces by the electrodes.

17. Bonding apparatus comprising:

a base,
a plurality of body members mounted for independent movement with respect to the base,
drive means for moving the body members,
a plurality of electrodes, one for each body member, said electrodes being adapted to be moved into engagement with workpieces by movement of the body members,
force-setting means for each electrode operable upon movement of each electrode's respective body member for controlling the force exerted by the electrode on the workpieces, each force-setting means having means for adjusting the force exerted by each electrode so that each electrode can independently apply a predetermined force on the workpiece,
means for applying a biasing voltage to the electrodes when they are in contact with the workpieces,
a program card containing coding,
a carrier for the workpieces, means mounting the carrier for movement with respect to the electrodes, and
means for controlling movement of the carrier beneath the electrodes, the control means comprising means for scanning the program card and directing movement of the carrier in response to the coding on the card, thereby to locate the workpieces with respect to the electrodes.

References Cited

UNITED STATES PATENTS

| | | | |
|---|---|---|---|
| 2,969,453 | 1/1961 | Page | 219—86 |
| 3,127,501 | 3/1964 | Mueller | 219—86 |
| 3,308,262 | 3/1967 | Fisher et al. | 219—78 |

JOSEPH V. TRUHE, Primary Examiner